United States Patent [19]

Armerding et al.

[11] 4,403,163
[45] Sep. 6, 1983

[54] CONDUCTOR BAR FOR ELECTRIC MACHINES AND METHOD OF MANUFACTURE THEREOF

[75] Inventors: Rainer Armerding, Ludwigshafen; Rupert Helmling, St. Leon-Rot; Waldemar Köpp, Mannheim; Harry Wagner, Weinheim; Peter Ehrt, Einhausen; Emil Böser, Mannheim, all of Fed. Rep. of Germany

[73] Assignee: Brown, Boveri & Cie AG, Mannheim, Fed. Rep. of Germany

[21] Appl. No.: 294,150

[22] Filed: Aug. 19, 1981

[30] Foreign Application Priority Data

Aug. 23, 1980 [DE] Fed. Rep. of Germany ....... 3031866

[51] Int. Cl.³ .............................................. H02K 3/14
[52] U.S. Cl. .................................... 310/213; 310/45; 310/196; 310/201; 174/34; 336/187
[58] Field of Search ................. 310/213, 201, 196, 45; 174/34; 336/187

[56] References Cited

U.S. PATENT DOCUMENTS

| 2,705,292 | 3/1955 | Wagenseil | 310/213 |
| 3,508,096 | 4/1970 | Kull | 310/196 |
| 4,308,476 | 12/1981 | Schuler | 310/213 |

FOREIGN PATENT DOCUMENTS

| 1164562 | 3/1964 | Fed. Rep. of Germany | 310/213 |
| 2755050 | 6/1979 | Fed. Rep. of Germany | 310/195 |
| 963790 | 2/1963 | United Kingdom | 310/213 |

Primary Examiner—R. Skudy
Attorney, Agent, or Firm—Herbert L. Lerner; Laurence A. Greenberg

[57] ABSTRACT

Conductor bar for electric machines operating at high voltage, including at least two subconductor packets being disposed side by side and being formed of mutually insulated subconductors, the subconductors being intertwined in such a manner that each subconductor occupies each possible physical position in at least one location within the conductor bar, an insulating sleeve, a semiconductor layer applied to the insulating sleeve, a further semiconductor layer disposed between the subconductor packets and the insulating sleeve, the conductor bar having a straight portion and narrow sides having a given width, a narrow-side subconductor bar crossing from one subconductor packet to another, the narrow-side subconductor bar being disposed at a given height filling a portion of the given width of the narrow side leaving a remaining width, hardenable cement layers being disposed substantially at the given height flanking the narrow-side conductor bar in vicinity of the crossing and filling the remaining width. The hardenable cement layers are extended over the entirety of the straight portion on each narrow side of the subconductor packets. Conducting strips disposed on the cement layers, the conducting strips and insulation of the insulated subconductors therebelow having holes formed therethrough, and conducting cement being filled into the holes.

5 Claims, 3 Drawing Figures

CONDUCTOR BAR FOR ELECTRIC MACHINES AND METHOD OF MANUFACTURE THEREOF

The invention relates to a conductor bar for electric machines for high operating voltage, with two conductor subsets which are disposed side by side and include subconductors that are insulated from each other; the subconductors of which being intertwined in such a manner that each subconductor occupies all possible physical positions within the bar at least once; an insulating sleeve and a semiconducting layer which is applied to the insulating sleeve, a further such layer which is arranged between the sets of subconductors and the insulating sleeve; and a narrow-side subconductor being flanked on both sides in the region of a crossing by cement layers filling the remaining width of the conductor bar. Such a conductor bar is known, for instance, from German Patent DE-PS No. 1 164 562.

A single large electric generator is nowadays capable of supplying power to cities of a half million people. The requirements as to operating reliability of such machines are therefore extremely high. Such machines should accordingly remain in operation around the clock for several years without interruption, between two inspection intervals.

The service life of the winding is of decisive importance in this connection. Damage to the stator winding usually occurs if voids are present in places within the conductor bar insulation.

In such locations nitrous gases are produced through glow discharge which decompose the insulation and, over the course of years, can lead to a breakdown from the conductor bar to the iron. The portions of the conductor bar on the top or bottom are especially endangered since only one subconductor is always present there and the width of the conductor package must be filled with filling compound. It is known to largely prevent this corona effect by corona protection arrangements as mentioned hereinafore. Certain conclusions can be drawn regarding the quality of the insulation by determining the dielectric loss factor.

In the known method for fabricating such conductor bars, the crossings of the transposed bar parts are ground bare for making contact with the internal corona protection and a metallic connection is made by means of a conducting layer serving as the corona protection. Furthermore, an additional operation is required for the application.

In another known conductor bar described in German Published, Non-Prosecuted Application DE-OS No. 27 55 050, each conductor packet is helically wrapped with an electrically semiconducting tape, or is wrapped with a wide semiconducting material in one closed turn, which is tied only at one point to the offset individual conductor. It changes into an ohmic connection in the high-voltage test, while an electric breakdown develops between an individual conductor and the internal corona protection.

A disadvantage of this known arrangement is, for instance, the additional space required in the width of the slot. To compensate for this, an increase of the tooth induction would be required, for example.

It is accordingly an object of the invention to provide a conduction bar for electric machines and a method of manufacture thereof, which overcomes the hereinaforementioned disadvantages of the heretofore known devices and methods of this general type, and to lower the costs of manufacture of a trouble-proof fully effective internal corona protection.

With the foregoing and other objects in view there is provided, in accordance with the invention, a conductor bar for electric machines operating at high voltage, comprising at least two subconductor packets or conductor subsets being disposed side by side and being formed of mutually insulated subconductors, the subconductors being intertwined in such a manner that each subconductor occupies each possible physical position in at least one location within the conductor bar, an insulating sleeve, a semiconductor layer applied to the insulating sleeve, a further semiconductor layer disposed between the subconductor packets and the insulating sleeve, the conductor bar having a straight portion and narrow sides having a given width, a narrow-side subconductor bar crossing from one subconductor packet to another, the narrow-side subconductor bar being disposed at a given height filling a portion of the given width of the narrow side leaving a remaining width, hardenable cement layers or masses being disposed substantially at the given height flanking the narrow-side conductor bar in the vicinity of the crossing and filling the remaining width, the hardenable cement layers being extended over the entirety of the straight portion on each narrow side of the subconductor packets, conducting strips disposed on the cement layers, the conducting strips and insulation of the insulated subconductors therebelow having holes formed therethrough, and conducting cement being filled into the holes.

In accordance with another feature of the invention, the conducting strips are formed of electrically conducting hard glass fabric.

In accordance with a further feature of the invention, the conducting strips cover the entirety of the straight part of the conductor bar.

In accordance with an added feature of the invention, the cement layers and conducting strip are combined in a sandwich prepreg; or it is used in their place. One operation can then be saved in production. In this manner, a low-resistance joint between the subconductors and the conductive layers is obtained. When making the holes in conductor bars with hollow conductors, care must be taken by using appropriate fixtures, for instance, so that the interior of the conductor is not tapped so as to prevent the coolant from escaping.

The above-mentioned measures are taken, according to the invention, in the entire offset range of the straight part of the conductor bar.

In accordance with an additional feature of the invention, the holes have diameters being substantially equal to the width of one of the subconductors.

In accordance with yet a further feature of the invention, there is provided a method providing a straight portion on the conductor bar, bundling at least two subconductor packets formed of mutually insulated subconductors along side each other by intertwining the subconductors in such a manner that each subconductor occupies each possible physical position in at least one location within the conductor bar, providing an insulating sleeve, applying a semiconductor layer to the insulating sleeve, placing a further semiconductor layer between the subconductor packets and the insulating sleeve, placing a narrow-side subconductor bar crossing from one subconductor packet to another at a given height filling a portion of a given width of a narrow side of the conductor bar leaving a remaining width, placing unhardened cement strips on the top and bottom of the bundled conductor bar subsequent to offsetting and bundling substantially at the given height flanking the narrow-side conductor bar in the vicinity of the crossing and filling the remaining width and extending over the entirety of the straight portion on each narrow side of the subconductor packets, placing conducting hard glass fabric strips on the cement strips, solidifying the straight portion of the conductor bar in a hot press, subsequently drilling through the conducting strips including the cement strips and insulation of the insulated subconductors with a bottoming drill, hardening the narrow-side subconductor bar, and filling the holes with conducting cement.

A method for manufacturing a conductor bar according to the invention is characterized by the following process steps which are partly known:

While pressing the conductor bar in the hot press, the former is solidified, and at the same time the hardenable cement fills the voids in the region of the offset and forms a unit with the conductor bar together with the conducting strips. The cement strip then also penetrates into the voids present at the crossings and fills the same.

In accordance with again another mode of the invention, there is provided a method which comprises placing a sandwich prepreg formed of a cement strip and a conducting strip on the top and bottom of the conductor bar bundle in place of the cement strips and conducting strips.

In accordance with a concomitant mode of the invention, there is provided a method which comprises wrapping the conductor bar bundle with separating tape, after placing the conducting strips on the cement strips and removing the separating tape after solidifying the straight portion.

The above-mentioned strips may also be made from several strips.

Instead of the above-mentioned conducting strips, a conducting fabric tape or a conducting foil may also be provided.

Other features which are considered as characteristic for the invention are set forth in the appended claims.

Although the invention is illustrated and described herein as embodied in conductor bar for electric machines and method of manufacture thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

In the conductor bar shown, the outer insulating sleeve and the subconductor insulation are not shown for reasons of clarity.

Figure 1:
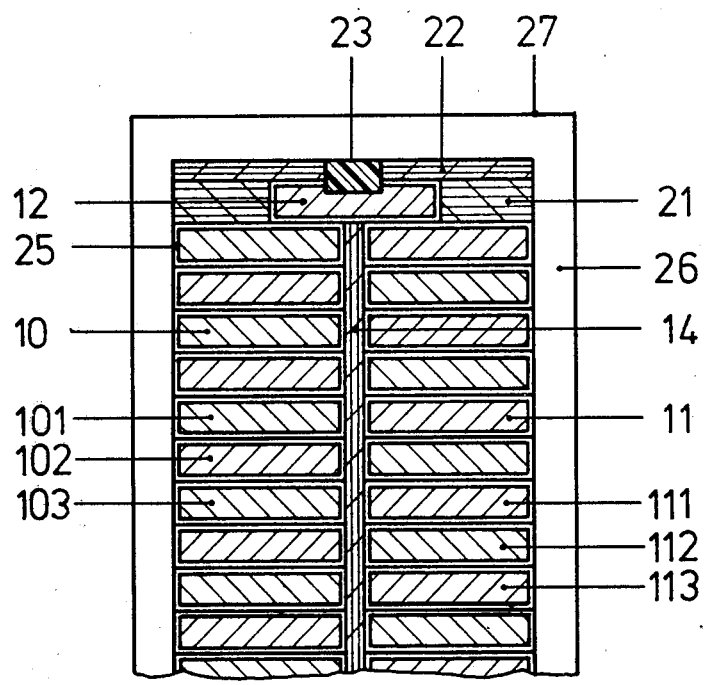
FIG. 1 is a fragmentary, diagrammatic cross-sectional view as seen through a conductor bar according to the invention in the vicinity of a crossing.
Figure 2:
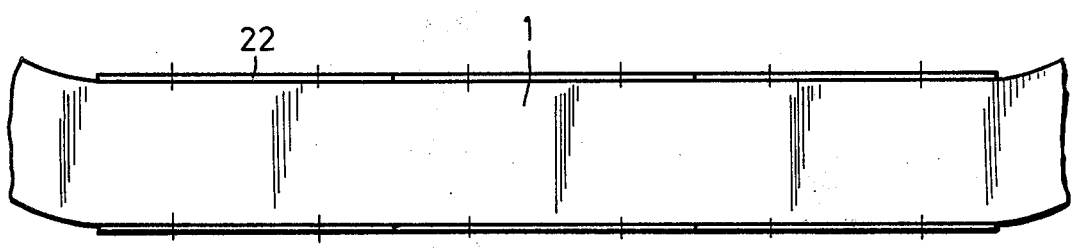
FIG. 2 is a fragmentary side elevational view onto the conductor bar of FIG. 1.
Figure 3:
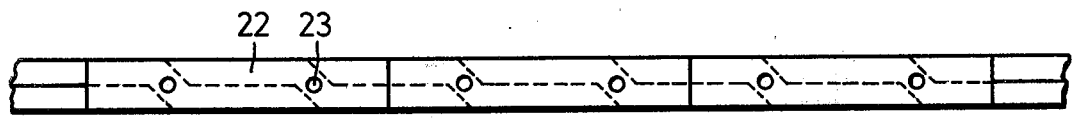
FIG. 3 is a fragmentary top plan view onto the conductor bar.

Referring now particularly to FIGS. 1–3 of the drawing as a whole, it is seen that the conductor bar 1 is built up from subconductor packets 10 and 11. These two subconductor packets 10, 11 are separated from each other by an insulating layer 14. The subconductor packets contain a number of subconductors 101, 102, ... and 111, 112 ... , respectively, which are intertwined in a known manner in accordance with the Roebel system. The narrow-side conductors or subconductors (which are the conductors which change on the narrow side from one into the other subconductor packet in the vicinity of the crossing) are designated with reference numeral 12. On both sides of the conductor bar, besides each narrow-side conductor 12, there is provided a cement layer 21, which is formed for instance of epoxymica cement. The cement layer is disposed at about the height of the narrow-side conductor 12, and it complements the irregular contours of the conductor bar to make a rectangular cross section. On the narrow side of the conductor bar, there is placed a hardenable cement strip 21 extending over the entire length of the straight part. A conducting strip 22 is placed on this cement layer 21. Instead of the cement strip 21 and a conducting strip 22, a sandwich prepreg (previously impregnated) unit including a cement strip and a conducting strip may also be provided.

In the region of the narrow-side conductors, holes 23 are formed in the upper layer. These holes are provided at spacings such that in the region of each conducting strip, there is at least one hole. The hole extends to a depth such that it just penetrates into the narrow-side subconductor. The hole must not be too deep if the narrow-side subconductor is a hollow conductor, so that leaks are avoided with certainty.

The holes 23 are filled with a conducting cement, which ensures that the potential of the conducting layer between the insulating sleeve and the conductor package corresponds to that of the conductors. In this manner, corona in voids that might occur in production can be avoided with a high degree of certainty.

The conductor is fabricated in such a manner, that after the subconductor packages have been offset and bundled, the above-mentioned unhardened cement strips 21 or sandwich prepregs are placed on the top and bottom of the conductor bar. Conducting strips 22, such as electrically conductive hard glass fabric, are placed on these cement strips 21 and the conductor bundle is subsequently wrapped with separating tape. As shown in FIG. 1, a semiconductor layer 25 is disposed between the subconductor packets 10, 11 and an insulating sleeve 26. Another semiconductor layer 27 is applied to the insulating sleeve 26.

Subsequently, the straight part of the bar is solidified in a hot press. In the process, the conducting strip is cemented to the cement strip and forms a firm unit, the cement strip penetrating into the voids at the crossings and filling them. Subsequently, the conducting strips including the subconductor are drilled through with a bottoming drill and a drill hole is started into the subconductors, while care is taken to ensure that if hollow conductors are used, the interior of the hollow conductor is not tapped. The drilled holes 23 are subsequently filled with a conductive cement, which results in a low-resistance connection between the subconductors and the conducting layer of the internal corona protection.

There are claimed:

1. Conductor bar for electric machines operating at high voltage, comprising at least two subconductor packets being disposed side by side and being formed of mutually insulated subconductors, said subconductors being intertwined in such a manner that each subconductor occupies each possible physical position in at least one location within the conductor bar, an insulating sleeve, a semiconductor layer applied to said insulating sleeve, a further semiconductor layer disposed between said subconductor packets and said insulating sleeve, the conductor bar having a straight portion and narrow sides having a given width, a narrow-side subconductor bar crossing from one subconductor packet to another, said narrow-side subconductor bar being disposed at a given height filling a portion of the given width of the narrow side leaving a remaining width, hardenable cement layers being disposed substantially at said given height flanking said narrow-side conductor bar in the vicinity of the crossing and filling the remaining width, said hardenable cement layers being extended over the entirety of the straight portion on each narrow side of said subconductor packets, conducting strips disposed on said cement layers, said conducting strips and insulation of said insulated subconductors therebelow having holes formed therethrough, and conducting cement being filled into said holes.

2. Conductor bar according to claim 1, wherein said conducting strips are formed of electrically conducting hard glass fabric.

3. Conductor bar according to claim 1 or 2, wherein said conducting strips cover the entirety of the straight part of the conductor bar.

4. Conductor bar according to claim 1 or 2, wherein said cement layers and conducting strip are combined in a sandwich prepreg.

5. Conductor bar according to claim 1, wherein said holes have diameters being substantially equal to the width of one of said subconductors.

* * * * *